(12) United States Patent
Yamada et al.

(10) Patent No.: US 9,479,708 B2
(45) Date of Patent: Oct. 25, 2016

(54) IMAGE PROCESSING DEVICE, IMAGE PROCESSING METHOD, AND IMAGE PROCESSING PROGRAM

(71) Applicant: ACUTELOGIC CORPORATION, Shinagawa-ku, Tokyo (JP)

(72) Inventors: Isao Yamada, Tokyo (JP); Shunichi Kobayashi, Tokyo (JP); Tsutomu Okuno, Tokyo (JP)

(73) Assignee: ACUTELOGIC CORPORATION, Tokyo (JP)

( * ) Notice: Subject to any disclaimer, the term of this patent is extended or adjusted under 35 U.S.C. 154(b) by 0 days.

(21) Appl. No.: 14/905,368

(22) PCT Filed: Jul. 10, 2014

(86) PCT No.: PCT/JP2014/068376
§ 371 (c)(1),
(2) Date: Jan. 15, 2016

(87) PCT Pub. No.: WO2015/008681
PCT Pub. Date: Jan. 22, 2015

(65) Prior Publication Data
US 2016/0156851 A1    Jun. 2, 2016

(30) Foreign Application Priority Data
Jul. 18, 2013   (JP) ................................. 2013-149225

(51) Int. Cl.
*H04N 9/64* (2006.01)
*H04N 5/243* (2006.01)
(Continued)

(52) U.S. Cl.
CPC .............. *H04N 5/243* (2013.01); *H04N 1/401* (2013.01); *H04N 1/40093* (2013.01); *H04N 5/2351* (2013.01); *H04N 5/3572* (2013.01); *H04N 9/045* (2013.01)

(58) Field of Classification Search
CPC .. H04N 5/243; H04N 1/40093; H04N 1/401; H04N 5/2351; H04N 5/3572; H04N 9/045

USPC ........................ 348/251, 223.1, 224.1, 225.1
See application file for complete search history.

(56) References Cited

U.S. PATENT DOCUMENTS

2005/0185066 A1 *  8/2005  Nishimura ............. H04N 9/045
                                                    348/229.1
2006/0244848 A1 * 11/2006  Hori ................... H04N 5/23296
                                                    348/251

(Continued)

FOREIGN PATENT DOCUMENTS

JP     H08-079773 A      3/1996
JP     2005-278004 A    10/2005

(Continued)

OTHER PUBLICATIONS

Japanese office action issued on Jul. 15, 2014 in the counterpart Japanese office action.

(Continued)

*Primary Examiner* — Tuan Ho
*Assistant Examiner* — Zhenzhen Wu
(74) *Attorney, Agent, or Firm* — Mots Law, PLLC

(57) ABSTRACT

An imaging device is provided with the following: a trial shading-correction unit that performs trial shading correction on image data for each of a plurality of types of light source on the basis of correction information stored in a correction-information storage unit for each light-source type; a correction-information selection unit (whereby the results of the shading correction performed by the trial shading-correction unit for each light-source type are compared to each other and correction information corresponding to an appropriate shading-correction result is selected from among the correction information stored by the correction-information storage unit per light-source type; and a shading correction unit that performs color-shading correction on the image data on the basis of the correction information selected by the correction-information selection unit.

18 Claims, 10 Drawing Sheets

(51) Int. Cl.
*H04N 1/401* (2006.01)
*H04N 1/40* (2006.01)
*H04N 5/357* (2011.01)
*H04N 9/04* (2006.01)
*H04N 5/235* (2006.01)

(56) References Cited

U.S. PATENT DOCUMENTS

2008/0074515 A1 3/2008 Takane
2008/0259186 A1* 10/2008 Wang .................. H04N 5/3572
348/238

FOREIGN PATENT DOCUMENTS

| JP | 2006-229425 A | 8/2006 |
| JP | 2008-085388 A | 4/2008 |
| JP | 2008-153848 A | 7/2008 |
| JP | 2008-277926 A | 11/2008 |
| JP | 2013-198041 A | 9/2013 |

OTHER PUBLICATIONS

ISR mailed on Aug. 19, 2014.

\* cited by examiner

| No. | LIGHT-SOURCE | SUNLIGHT/ARTIFICIAL LIGHT-SOURCE | SHADING COEFFICIENT (jr1-jr4,jb1-jb4) | SHOOTING CONDITIONS |
|---|---|---|---|---|
| 1 | BLUE SKY | SUNLIGHT | ... | ... |
| 2 | SHADE | SUNLIGHT | ... | ... |
| 3 | CLOUDY WEATHER | SUNLIGHT | ... | ... |
| 4 | SUNNY WEATHER | SUNLIGHT | COEFFICIENT SET 1 | p1 |
| | | | COEFFICIENT SET 2 | p2 |
| 5 | SUNSET | SUNLIGHT | ... | ... |
| 6 | TYPICAL FLUORESCENT LIGHT | ARTIFICIAL LIGHT-SOURCE | ... | ... |
| 7 | THREE WAVELENGTH BAND EMISSION FLUORESCENT LAMP | ARTIFICIAL LIGHT-SOURCE | ... | ... |
| 8 | HIGH COLOR RENDERING FLUORESCENT LIGHT | ARTIFICIAL LIGHT-SOURCE | ... | ... |
| 9 | LED LIGHT-SOURCE | ARTIFICIAL LIGHT-SOURCE | ... | ... |
| 10 | LIGHT BULB | ARTIFICIAL LIGHT-SOURCE | ... | ... |
| 11 | HALOGEN | ARTIFICIAL LIGHT-SOURCE | ... | ... |

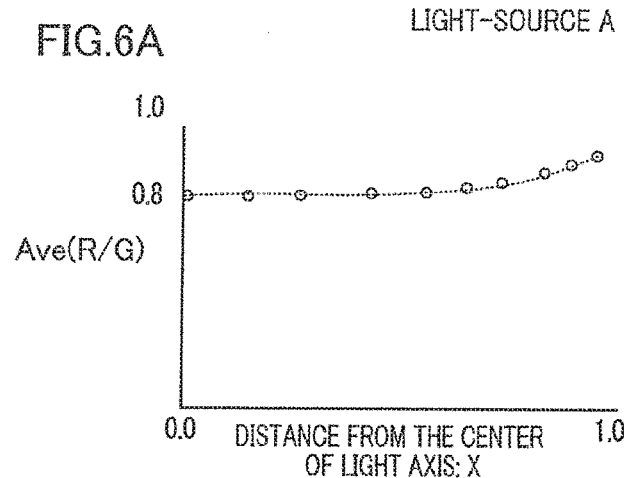
FIG.6A LIGHT-SOURCE A
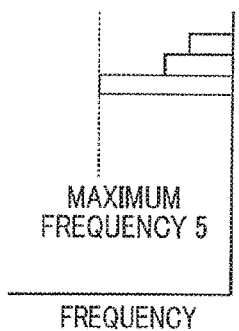
FIG.6B
MAXIMUM FREQUENCY 5
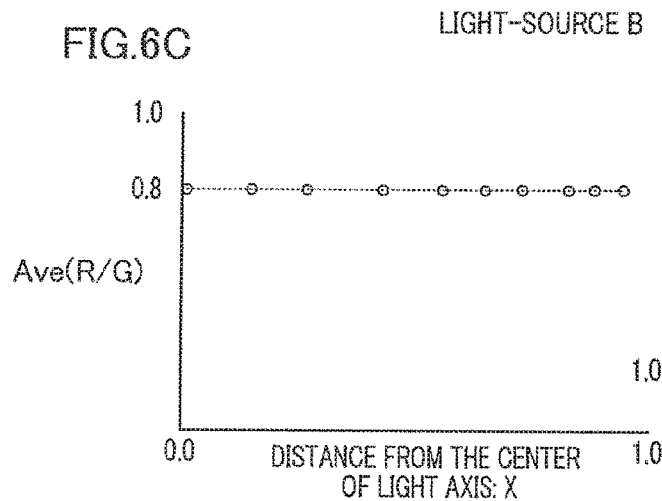
FIG.6C LIGHT-SOURCE B
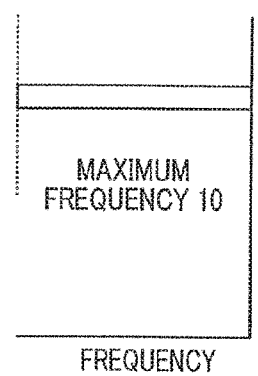
FIG.6D
MAXIMUM FREQUENCY 10
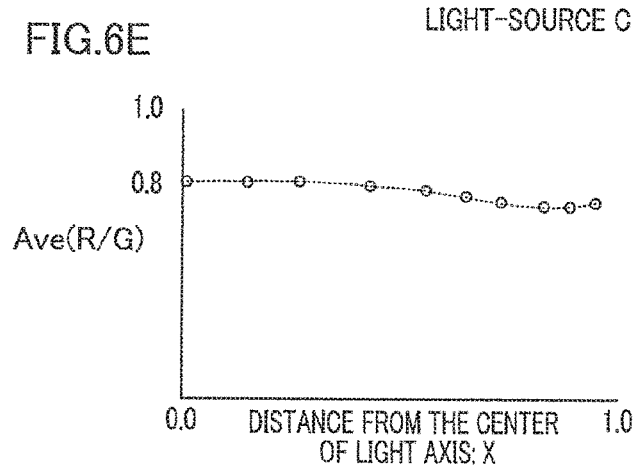
FIG.6E LIGHT-SOURCE C
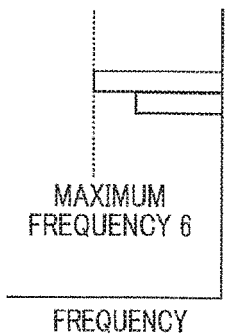
FIG.6F
MAXIMUM FREQUENCY 6

LIGHT-SOURCE A

LIGHT-SOURCE B

LIGHT-SOURCE C

IMAGE PROCESSING DEVICE, IMAGE PROCESSING METHOD, AND IMAGE PROCESSING PROGRAM

TECHNICAL FIELD

The present invention relates to an image processing device, an image processing method, and an image processing program for performing shading correction on image data.

BACK GROUND ART

When recording an image of a subject, shading may take place in which colors and brightness of the captured image expressed in the form of pixels deviate among the pixels. For example, even if the subject presents a single color, the shading, when it takes place, causes the pixel values to deviate from that single color, in a peripheral portion of the recorded image. To restrain this shading, various technologies have been suggested. An example is to perform shading correction in image processing. In PTL 1, different correction coefficients are set in advance for pixel positions and color signals, respectively, and shading correction is performed to image data, using the correction coefficients. Shading however depends on ambient light at the time of recording, spectrum characteristics of the light-source, and spectral characteristics of the subject. For this reason, a single set of correction coefficients may not bring about a sufficient correction effect.

Meanwhile, PTL 2 discloses a method in which signals corresponding to R, G, and B of image data are integrated, obtain chromaticity coordinates from ratios R/G and B/G representing color components, and the amount of shading correction is adjusted according to the distance from the black body radiation curve on the same color temperature. This method allows favorable shading correction for shading which varies depending on the light-source.

Further, PTL 3 discloses a method of calculating a shading correction characteristic based on the color temperature calculated by a white balance estimation unit.

CITATION LISTINGS

Patent Literature

[PTL 1] Japanese Unexamined Patent Publication No. 079773/1996 (Tokukaihei 8-079773)
[PTL 2] Japanese Unexamined Patent Publication No. 2006-229425 (Tokukai 2006-229425)
[PTL 3] Japanese Unexamined Patent Publication No. 2005-278004 (Tokukai 2005-278004)

DISCLOSURE OF THE INVENTION

Technical Problem

Traditionally, correction characteristics for correcting shading are calculated mainly from the color temperature of the light-source and the chromaticity coordinate. However, even though the color temperatures and the chromaticity coordinates of the light-sources are substantially the same, there are cases where the shading characteristic varies. An example is a light bulb and a fluorescent light which lights in a light-bulb color. Although the color temperatures and the chromaticity coordinates of these two types of light-sources are substantially the same, the spectral characteristics are significantly different, and therefore different types of shading occur. The light-sources having substantially the same color temperatures and the chromaticity coordinates are not distinguished from one another with the above traditional way of calculating the correction characteristic for correcting shading based on the color temperature and the chromaticity coordinates does. Due to this, shading is not accurately corrected.

An object of the present invention is to provide an image processing device, an image processing method, and an image processing program that enables shading correction while enabling more accurate distinguishing of the light-sources.

Solution to Problem

An image processing device of the present invention includes: a storage means for storing shading characteristics and sets of correction information indicative of any of correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said shading characteristics and said sets of correction information are stored in association with a plurality of light-source types as shooting conditions, respectively; a trial correction means for performing trial shading correction on image data based on the sets of correction information stored in the storage means, the trial shading correction performed in relation to at least two light-source types out of the plurality of light-source types; a first selection means for comparing results of the shading correction with one another, the shading correction being performed by the trial correction means in relation to said at least two light-source types, and selecting a set of correction information that leads to a suitable shading-correction result, out of the sets of correction information stored in the storage means in association with the plurality of light-source types; and a correction means for performing shading correction on the image data based on the set of correction information selected by the first selection means.

An image processing method of the present invention includes the steps of: a trial correction step of performing trial shading correction on image data based on a set of correction information stored in a storage means which stores shading characteristics and sets of correction information indicative of any of correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said shading characteristics and said sets of correction information are stored in association with a plurality of light-source types as shooting conditions, respectively, the trial shading correction performed in relation to at least each of two light-source types, out of the plurality of light-source types, a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step.

An image processing program of the present invention is an image processing program which causes a computer to function so as to perform shading correction on image data, configured to execute the steps of: a trial correction step of performing trial shading correction on image data based on a set of correction information stored in a storage means which stores shading characteristics and sets of correction information indicative of any of correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said shading characteristics and said sets of correction information are stored in association with a plurality of light-source types as shooting conditions, respectively, the trial shading correction performed in relation to at least each of two light-source types, out of the plurality of light-source types; a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step.

Advantageous Effects of Invention

In the present invention, results of trial shading correction performed in relation to at least two types of light-sources are compared with one another, and correction information that leads to a suitable shading-correction result is used for shading correction. Therefore, unlike the traditional art, shading correction on image data is possible by estimating a shading characteristic from image data, without a need for information such as color temperature or chromaticity. In other words, shading correction is performed while accurately distinguishing the light-source from the image data.

BRIEF DESCRIPTION OF THE DRAWINGS

FIG. 2 is a schematic diagram showing Bayer array.

FIG. 4 is a diagram showing an example of database

FIGs. 6(a)-6(f) show example cases where color shading correction is performed to image data of a subject presenting a single color. FIG. 6(a) and FIG. 6(b) are graphs of cases where color shading correction is performed with correction information corresponding light-source A. FIG. 6(c) and FIG. 6(d) are graphs of cases where color shading correction is performed with correction information corresponding light-source B. FIG. 6(e) and FIG. 6(f) are graphs of cases where color shading correction is performed with correction information corresponding light-source C.

FIG. 7(a) and FIG. 7(b) are graphs of cases where color shading correction is performed with correction information corresponding light-source A. FIG. 7(c) and FIG. 7(d) are graphs of cases where color shading correction is performed with correction information corresponding light-source B. FIG. 7(e) and FIG. 7(f) are graphs of cases where color shading correction is performed with correction information corresponding light-source C.

FIG. 10(a) and FIG. 10(b) are graphs of cases where color shading correction is performed with correction information corresponding light-source A. FIG. 10(c) and FIG. 10(d) are graphs of cases where color shading correction is performed with correction information corresponding light-source B. FIG. 10(e) and FIG. 10(f) are graphs of cases where color shading correction is performed with correction information corresponding light-source C.

DESCRIPTION OF EMBODIMENT

Figure 1:
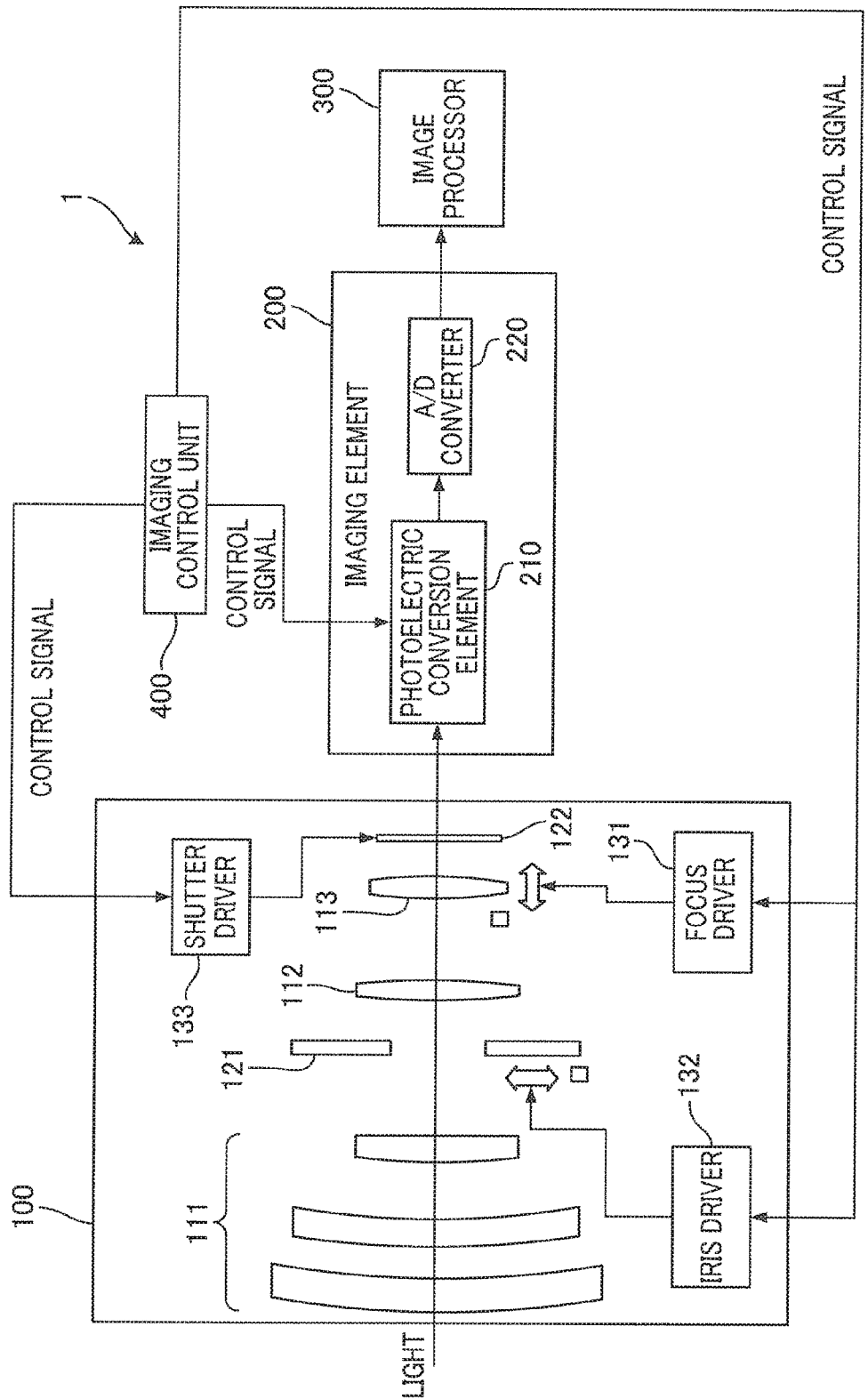
FIG. 1 is a block diagram showing a structure of an imaging device related to an embodiment of the present invention.

The following describes Embodiment 1 of the present invention. As shown in FIG. 1, an imaging device 1 includes: an image capture optical system 100 configured to guide and form a subject image on an imaging element 200; the imaging element 200 configured to conduct photoelectric conversion to the subject image formed, and output image data; an image processor 300 configured to conduct a predetermined image processing to the image data output from the imaging element 200, and reproduce the subject image; and an imaging control unit 400 configured to control the image capture optical system 100 and the imaging element 200. Image data of a still image is generated from the image data corresponding to an image of one frame output from the image processor 300, and moving picture data is generated from image data corresponding to images of multiple frames output time-sequentially from the image processor 300.

The image capture optical system 100 includes: a front lens set 111 including a lens for taking light reflected off an imaging subject into the imaging device 1, a lens for zooming on the imaging target, and the like; a correction lens 112; a focus lens 113 capable of moving forward and backward to adjust the focal position; an iris (diaphragm) 121 with an adjustable f-value which regulates the amount of entering light reflected off the imaging subject; and a mechanical shutter 122 configured to block or admit incident light directed to the imaging element 200. The focus lens 113, the iris 121, and the shutter 122 are driven by a focus driver 131, an iris driver 132, and a shutter driver 133, respectively. Operations of the focus driver 131, the iris driver 132, and the shutter driver 133 are controlled based on control signals from the imaging control unit 400.

The imaging element 200 includes: a plurality of photoelectric conversion elements 210 configured to output analog signals according to light income; and an A/D converter 220 configured to convert the analog signals output from the photoelectric conversion elements 210 into digital signals.

To each of the photoelectric conversion elements 210 is provided color filters. Each color filter corresponds to any color component out of three primary colors: i.e., R (Red), G (Green), and B (Blue). Each color filter transmits light of the subject image formed by the image capture optical system 100 and filters out light of a single color which is then received by the photoelectric conversion element 210. The photoelectric conversion element 210 outputs, as analog electric signals, electric charges according to the intensity of light of the single color filtered out through the color filter. As should be understood from the above, the imaging element 200 is structured as a single plate imaging element. The sensitivities of the photoelectric conversion elements 210 are controlled based on the control signals from the imaging control unit 400.

Figure 2:
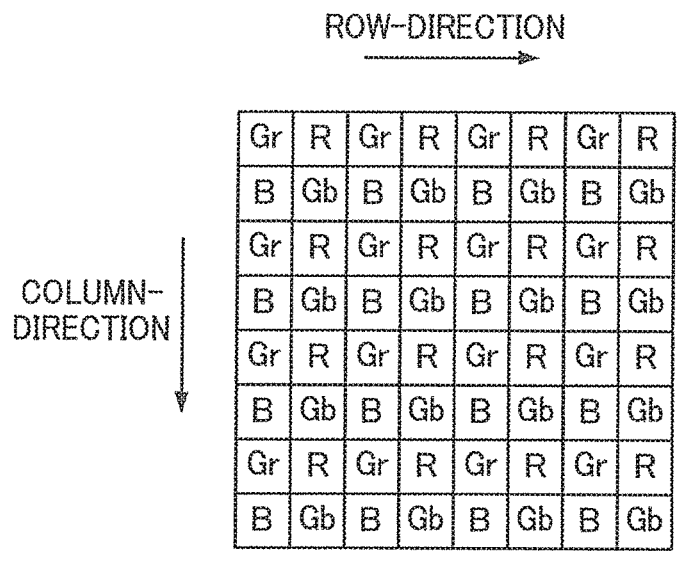

FIG. 2 shows a Bayer array. The Bayer array is an array of the color filters, and includes rows each having G-color filters and R-color filters alternately arranged in a row-direction (hereinafter, X-direction) which rows are alternated in a column-direction (hereinafter, Y-direction) with rows each having G-color filter and B-color filters alternately arranged in the X-direction. In the array, G-color filters are arranged in a checked pattern. In the present embodiment, G-color alternated with R in the X-direction is referred to as Gr, and G-color alternated with B in the X-direction is referred to as Gb. Further, an image formed by the Bayer array of pixels is hereinafter referred to as "Bayer image".

The analog signals output from the photoelectric conversion elements 210 are converted into digital signals by the A/D converter 220, and are output, as image data, to the image processor 300.

The imaging control unit 400 controls the focal position of the focus lens 113, the f-value of the iris 121, and the shutter speed of the mechanical shutter 122 in the image capture optical system 100. Specifically, the imaging control unit 400 performs the above controls by transmitting control signals to the focus driver 131 which drives the focus lens 113, the iris driver 132 which drives the iris 121, and the shutter driver 133 which drives the mechanical shutter 122. The imaging control unit 400 also controls the sensitivities of the photoelectric conversion elements 210 of the imaging element 200. Specifically, the imaging control unit 400 performs the above control by transmitting control signals to the photoelectric conversion elements 210. It should be noted that the focal position of the focus lens 113, the f-value of the iris 121, the shutter speed of the mechanical shutter 122, and the sensitivities of the photoelectric conversion elements 210 (which are all hereinafter collectively referred to as "imaging conditions") are variable through a not-shown operation unit.

Figure 3:
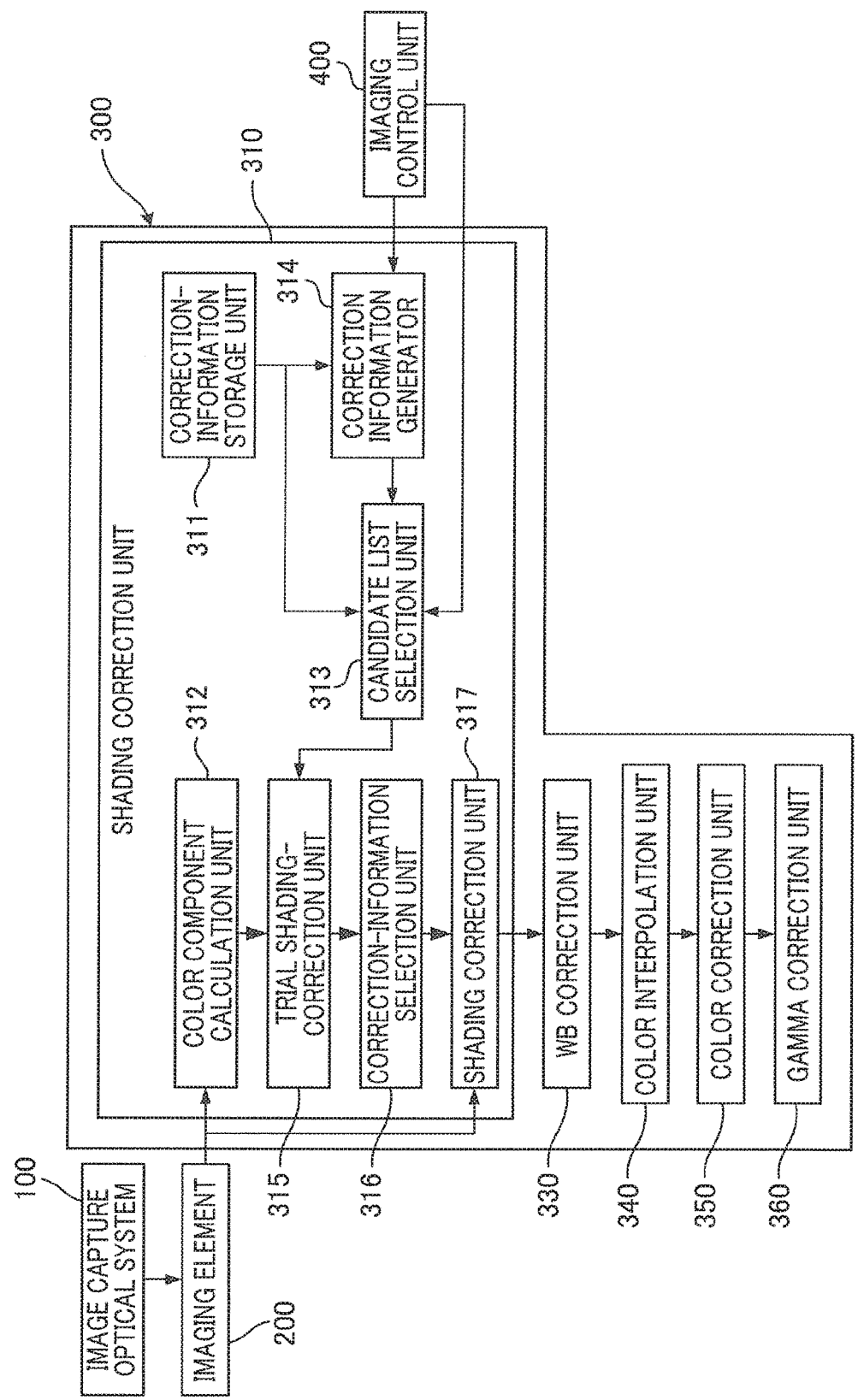
FIG. 3 is a block diagram showing a structure of an image processor.

Next, the following describes the image processor 300 which conducts a predetermined image processing to image data output from the imaging element 200. As shown in FIG. 3, the image processor 300 includes: a shading correction unit 310, a WB correction unit 330, a color interpolation unit 340, a color correction unit 350, and a gamma correction unit 360. The image processor 300 is structured by a CPU (Central Processing Unit), ROM (Read Only Memory), other various hardware, a program stored in the ROM, and other software. The software causes the hardware to function as various functional units of the shading correction unit 310 and the like, thereby realizing the image processor 300. Alternatively, the shading correction unit 310 and the like may be structured by electronic circuits and the like specialized for calculation processes in the various functional units, or may be structured in such a manner that electronic circuits and the like specialized for calculation processes in various functional units cooperates with a combination structure of hardware and software which realizes the various functional units.

The shading correction unit 310 performs color shading correction on image data. The details are provided later.

The WB correction unit 330 performs a white balance correction process to image data from the shading correction unit 310. The white balance correction process is a process of correcting the balance of RGB levels in the entire signals so that, when imaging a subject of an achromatic color, the pixel values are each properly R=G=B. The color interpolation unit 340 converts image data from the WB correction unit 330 into signals defining all of the R, G, and B for each pixel.

The color correction unit 350 linear-transforms RGB signals from the color interpolation unit 340, using a color reproduction matrix, and corrects them to predetermined signal levels. The gamma correction unit 360 performs gray scale conversion to RGB signals from the color correction unit 350 based on pre-stored proper exposures, and performs gamma conversion according to color display characteristics of a display and the like which outputs an image. Each pixel of image data is a signal representing data without a predetermined gray scale such as $2^8=256$ gray scale. To convert the signal into one with a related gray scale, the gray scale conversion is performed by the gamma correction unit 360. The image processor 300 outputs signals including RGB signals, brightness signals Y, and color difference signals Cb and CR, which are converted from output signals from the gamma correction unit 360. Based on the output image data, an image is displayed on a not-shown display unit, or stored in a storage and the like as an image file. It should be noted that the image processor 300 may be configured to perform processes such as noise reduction, defective pixel correction, aberration correction, scaling of images, compression of image data, and the like, in addition to the above described image processing.

Next, the following describes shading correction unit 310. First described is the overview of the shading correction in the present embodiment. While light incident on a center portion of the imaging element 200, via the image capture optical system 100 is essentially normal incident light, light incident on peripheral portions of the light reception area includes more angled light components. Due to this, there will be variation in the light intensity to be received by pixels between the center portion and the peripheral portion of the light reception area, thus leading to shading. Further, due to dependency on the wavelength and incident angles of the refraction index and transmittance of various lenses in the image capture optical system 100, color shading may take place. For example, even if the subject presents a single color, the shading, when it takes place, causes the pixel values to deviate from the single color, in a peripheral portion of the captured image. The shading phenomena can be either color shading in which a color component of a pixel deviates from the original color component of the subject, or brightness shading in which a brightness component of a pixel deviates from the original brightness component of the subject. The present embodiment deals with a case of correcting color shading (color shading correction) on image data.

In the present embodiment, information indicative of a function corresponding to a color shading characteristic (hereinafter, "characteristic function") is used as correction information for correcting color shading. The characteristic function indicates pixel values of various positions in a captured image, when the image capture optical system 100 and the imaging element 200 are used to capture an image of a subject presenting a single color (e.g., a subject that would result in a captured image with all the pixels in white). The characteristic function of the present embodiment is a function according to the distance from a pixel at the center (center of the optical axis) out of the pixels constituting the image data. When expressing the positions in the image in (X, Y), the characteristic function may be expressed as a function of X and Y. However, the amount of calculation is reduced by making the characteristic function a function about the distance from the center of the optical axis, as in the present embodiment.

It should be noted that isotropic characteristic with the optical axis as the center, as in the characteristic function of the present embodiment, takes into account the design trends in the recent imaging device as described below. Firstly, image height-principal ray angle characteristic is non-linear and not a monotonic increase. This corresponds to, for example, a decrease in the exit pupil distance due to lowering of profile, as in portable terminals. Secondly, the spectral characteristics of the optical system and image capturing system are dependent on the principal ray angle and the wavelength. This accompanies reduction of costs, or is seen in cases of providing an IRCF (Infrared Cut Filter) by cost-efficient thin film deposition.

Further, in the present embodiment, color components are subjected to color shading correction, where the color components are a ratio R/G of an R pixel value with respect to a G pixel value and a ratio B/G of a B pixel value with respect to a G pixel value as color components. This way, the brightness information is excluded from the correction target, and only the color information is extracted.

Specific examples of the characteristic function are as follows. Where the distance from the center pixel of image data is X, a characteristic function fr(x) relative to a color component R/G and a characteristic function fb(x) relative to a color component B/G are approximately represented as the following Expression (1) and Expression (2).

$$fr(x)=jr0(1+jr1*x^2+jr2*x^4+jr3*x^6+jr4*x^8) \quad \text{Expression (1)}$$

$$fb(x)=jb0(1+jb1*x^2+jb2*x^4+jb3*x^6+jb4*x^8) \quad \text{Expression (2)}$$

It should be noted that, in the present embodiment, the distance normalized so that the distance from the center pixel to an end pixel of image data is 1. That is, X satisfies $0 \leq x \leq 1$. In Expression (1), fr(0)=jr0 indicates the color component R/G at the center pixel (x=0) of the image data. Similarly, in Expression (2), fb(0)=jb0 indicates the color component B/G at the center pixel of the image data. The above fr(x)/jr0 and fb(x)/jb0 each indicates the color intensity of a pixel relative to a single color (color components R/G and B/G), in relation to a position X. Therefore, coefficients jr1 to jr4 and jb1 to jb4 in the fr(x)/jr0 and fb(x)/jb0 are parameters indicating irregularity, i.e., color shading characteristics, in the color of a captured image captured by the imaging element 200 of the image capture optical system 100. When an image of the subject in a single color is captured, the above parameters should be 0, in the first place. However, these parameters are not 0, if color shading occurs due to difference in the spectral characteristics of the light-source and the subject, the dependency of the spectral characteristics of the optical system and the image capturing system on the main linear light angle and wavelength, as hereinabove described. It should be noted that the coefficients jr1 to jr4 and the coefficients jb1 to jb4 are hereinafter also referred to as "shading coefficients".

The order of the characteristic function does not necessarily have to be the eighth degree. Further, depending on the optical system, there may be cases where a lower degree function will suffice and cases where a higher degree function is required for expression. In such cases, the degree may be expanded or reduced as needed. Further, the above Expression (1) and Expression (2) each contains only even-degree terms for reducing the amount of calculation; however, the expressions may contain odd-degree terms Further, the curve indicated by the above expression may be in various shapes depending on the parameters. The curve does not necessarily have to be a monotonous increase or monotonous decrease, provided that it is within the range of $0 \leq x \leq 1$. Color shading characteristic may not exhibit a monotonous increase in cases of designing optical system with a principal ray angle characteristic that is not linear and does not increase monotonously with respect to the imaged height x, and in cases of color shading characteristic corresponding to the foregoing cases. Further, the color shading characteristic may be expressed in different color space other than R/G and B/G. For example, a space such as CIE xyz, L*a*b, and the like may be used for expression.

To perform color shading correction based on the above, The shading correction unit 310 includes: a correction-information storage unit 311 (storage means); a color component calculation unit 312; a candidate list selection unit 313 (second selection means); a correction information generator 314 (correction-information generating means); a trial shading-correction unit 315 (trial correction means); a correction-information selection unit 316 (first selection means); and a shading correction executing unit 317 (correction means).

The correction-information storage unit 311 stores sets of correction information, each of which sets is associated with any of a plurality of light-source types as shooting conditions. In the present embodiment, shading coefficients under a plurality of light-sources (sun light, typical fluorescent lights, LED light sources, and the like) are calculated in advance. Specifically, an image of a subject with an even color under each light-source is taken by using the imaging device 1, and shading coefficients are calculated by fitting through a least-squares method and the like. Further, images of the subject are taken with the imaging device 1 under various shooting conditions (the focal position of the focus lens 113, the f-value of the iris 121, the shutter speed of the mechanical shutter 122, the sensitivities of the photoelectric conversion elements 210), and the shading coefficients are calculated. Then, the calculated shading coefficients, the types of the light-sources, and the shooting conditions are stored, in association with each other, in the correction-information storage unit 311. In the present embodiment, the correction-information storage unit 311 stores Expression (1) and Expression (2), and the shading coefficients of the shading characteristics which are different depending on the light-sources.

FIG. 4 is an example database (table) in which the correction information is stored. As shown in the figure, the database includes fields (columns) of "Number", "Light-Source", "Sun Light/Artificial Light-Source", "shading Coefficient", and "Shooting Condition".

The "Number" field stores a number for unambiguously specifying a record (row) contained in the database. The "Light-Source" field stores information on the type of the light-source (Under the blue sky, in the shade, a typical fluorescent light, an LED light-source, and the like). The "Sun Light/Artificial Light-Source" field stores information on whether the light-source at the time of shooting is sun light or an artificial light-source. The "shading coefficient" field stores shading coefficients (jr1 to jr4, jb1 to jb4) corresponding to each light-source. The "Shooting Condition" field stores the shooting condition at the time of shooting. Each record may contain a plurality of sets of shading coefficients according to the shooting condition. For example, Number 4 shown in FIG. 4 contains a coefficient set 1 which is a set of shading coefficients where the focal position of the focus lens 113 is p1, and a coefficient set 2 which is a set of shading coefficients where the focal position of the focus lens 113 is p2.

The color component calculation unit 312 calculates color components corresponding to R/G and B/G, from image data output from the imaging element 200. The color component calculation unit 312 divides image data into blocks (pixel blocks) each including a plurality of pixels. For example, as indicated by the bold lines in FIG. 2, the color component calculation unit 312 divides the Bayer image into unit blocks each including pixels of 4 rows×4 columns, and handle the image in the form of plural blocks. Then, the color component calculation unit 312 integrates pixel values of the R-pixels, the G-pixels, and the B-pixels in each block. The integrated values are $\Sigma R$, $\Sigma G$, and $\Sigma B$, respectively. Next, the color component calculation unit 312 divides the $\Sigma R$, $\Sigma G$, and $\Sigma B$ by the numbers of R-pixels, G-pixels, and B-pixels in each block to calculate the average values in each block, respectively. The average values related to R, G, and B are AveR, AveG, and AveB, respectively. Then, the color component calculation unit 312 divides the AveR and AveB by AveG to remove the brightness component. This way, AveR/AveG and AveB/AveG are calculated as color components on block-by-block basis. These color components are hereinafter referred to as color component Ave(R/G) and color component Ave(B/G).

It should be noted that the image data may be divided in a grid manner (rows×column) as described above, or may be divided into concentric circles about the center of the image data. The number of blocks into which the image data is divided (i.e., the number of pixels in a unit block) may be set to any number. However, the larger the number of blocks (the smaller the number of pixels in each block), the less the influence of the mixing color will be within each unit block, and hence the accuracy of the later-described correction information is improved. However, the amount of calculation involved will increase proportionally to the number of blocks. Therefore, the number of blocks may be suitably set, taking into account the amount of calculation involved in combination with the accuracy in the selection of the correction information.

The candidate list selection unit 313 selects candidates of correction information (hereinafter also referred to as "candidate list") from correction information in the correction-information storage unit 311, in relation to a plurality of light-source types, based on the shooting condition involving an image capture optical system 100 and the imaging element 200. The candidate list is for the later-described correction-information selection unit 316 to select correction information that leads to a suitable color shading-correction result. Specifically, the candidate list selection unit 313 retrieves information of shooting conditions at the time of taking a picture from the imaging control unit 400. Then, the candidate list selection unit 313 estimates the illuminance at the time of taking picture, based on the shutter speed of the mechanical shutter 122, the f-value of the iris 121, and the sensor sensitivities of the imaging element 200 out of the shooting conditions obtained from the imaging control unit 400. when the estimated illuminance is a predetermined value or higher, the candidate list selection unit 313 selects, from the database, correction information where the light-source is sun light (first correction information, Numbers 1 to 5 in the database) as the candidate list. On the other hand, when the estimated illuminance is less than the predetermined value or higher, the candidate list selection unit 313 selects, from the database, correction information where the light-source is an artificial light-source (second correction information, Numbers 6 to 11 in the database) as the candidate list.

If the candidate list selected by the candidate list selection unit 313 includes a set of correction information which corresponds to shooting conditions not included in those obtainable from the imaging control unit 400, the correction information generator 314 newly generates a set of correction information corresponding to that shooting conditions not yet included, based on the correction information stored in the correction-information storage unit 311.

For example, suppose that the candidate list includes a light-source corresponding to Number 4 in FIG. 4, and that the focal position of the focus lens 113 obtained from the imaging control unit 400 is different from the both of the p1 and p2. In this case, the focal position of the focus lens 113 and the correction information are regarded as to have a linear relation, and a new shading coefficient is generated (synthesized) by linear interpolation, based on the coefficient set 1 and coefficient set 2. For example, according to the positional relation between p1 and p2, a linear combination of jr1 of the coefficient set 1 and jr1 of the coefficient set 2 is calculated, and the calculated value serves as a new shading coefficient jr1. The correction information newly generated by the correction information generator 314 is used by the trial shading-correction unit 315 and the shading correction unit 317. It should be noted that, if the focal position of the focus lens 113 is not in a linear relation with the correction information, generating of the correction information is possible by approximation with a suitable N-th order function and the like.

The trial shading-correction unit 315 performs trial color shading correction on image data for each light-source, based on the correction information stored in the correction-information storage unit 311. The trial shading-correction unit 315 uses correction information of in the candidate list for color shading correction on image data. In the present embodiment, color components Ave (R/G) and Ave (B/G) of each block in image data, which are calculated by the color component calculation unit 312 are subjected to the trial color shading correction. The trial color shading correction is performed by calculation involving the following Expression (3) and Expression (4). The x at this time is the distance from the center pixel to any representative pixel of a block. The representative pixel may be, for example, a center pixel in each block indicated by bold lines in FIG. 2.

$$\text{Ave}(R/G)'=\text{Ave}(R/G)/(1+jr1*x^2+jr2*x^4+jr3*x^4+jr4*x^8) \quad \text{Expression (3)}$$

$$\text{Ave}(B/G)'=\text{Ave}(B/G)/(1+jb1*x^2+jb2*x^4+jb3*x^4+jb4*x^8) \quad \text{Expression (4)}$$

Based on the results of the color shading correction, the correction-information selection unit 316 sorts the blocks into a plurality of classes related to values of a color component. Then, for each light-source, the correction-information selection unit 316 totalizes the number of blocks in each of the classes, and selects correction information corresponding to a light-source that leads to aggregated values of the plurality of classes including the highest maximum value, as the correction information that leads to a suitable color shading-correction result. This method corresponds to histogram aggregation of correction results for each light-source, and selection of correction information associated with a light-source that leads to the highest maximum frequency.

The following describes the reasons why the above method allows selection of correction information that leads to a suitable color shading-correction result.

Figure 5A:
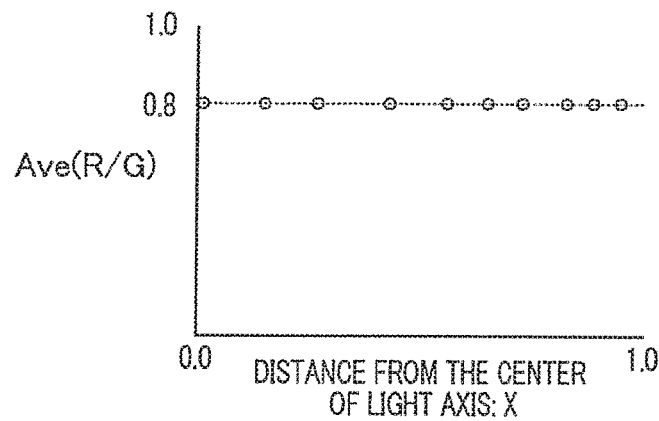
FIG. 5(a) and FIG. 5(b) are graphs of cases where no color shading takes place.
Figure 5B:
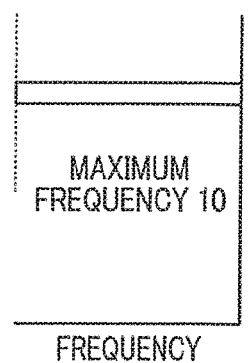
Figure 5C:
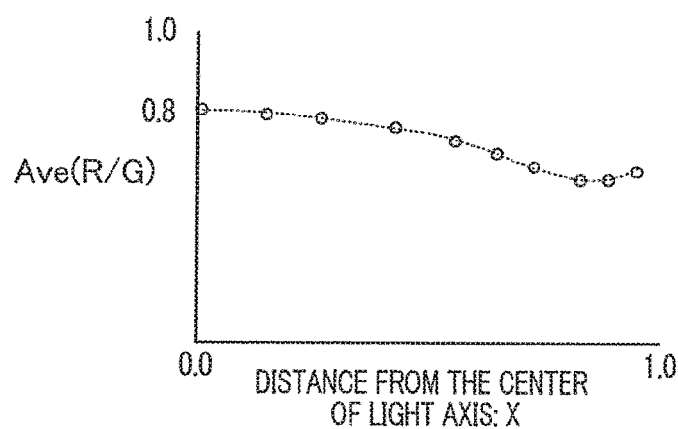
FIG. 5(c) and FIG. 5(d) are graphs of cases where color shading takes place.
Figure 5D:
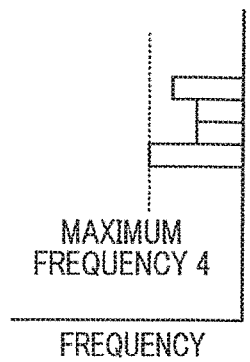
Figure 7A:
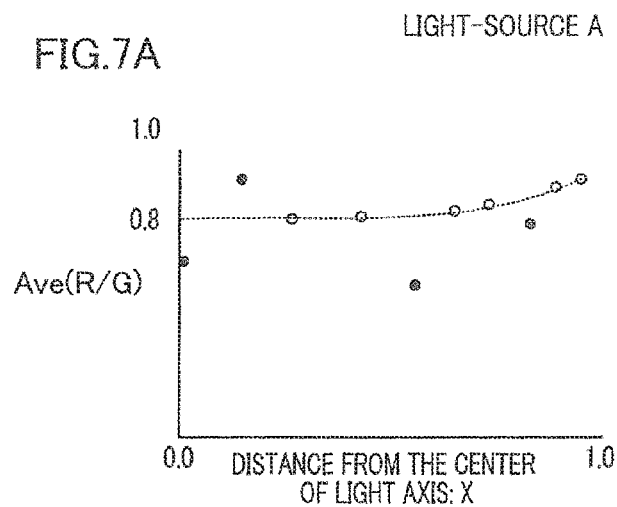
FIGs. 7(a)-7(f) show example cases where color shading correction is performed to image data of a subject presenting more than a single color.
Figure 7B:
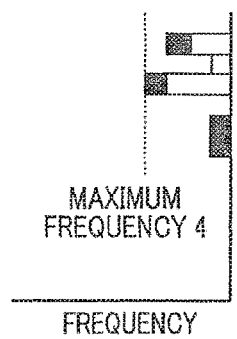
Figure 7C:
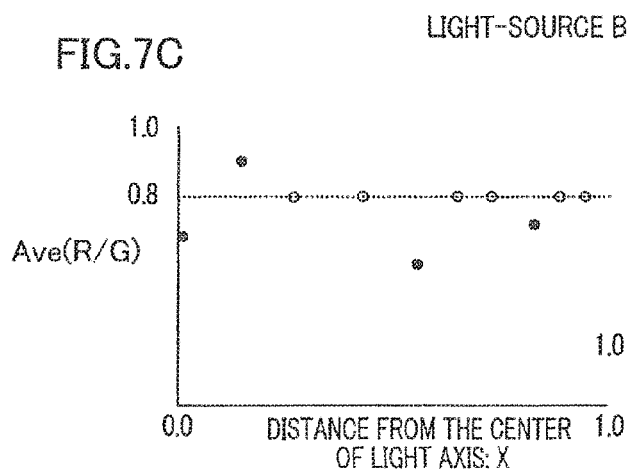
Figure 7D:
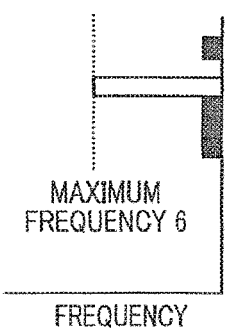
Figure 7E:
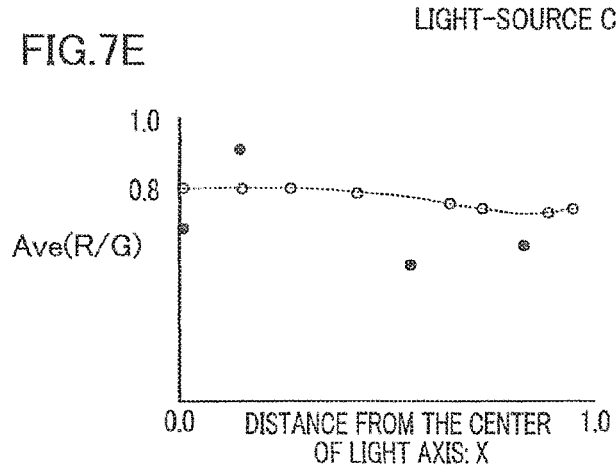
Figure 7F:
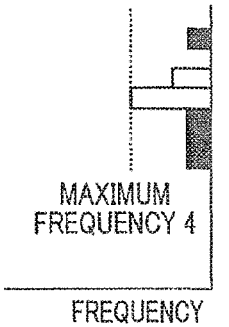

(1) First, it is assumed that the subject presents a single color. In this case, if no color shading occurs, the color component Ave (R/G) is a constant value as shown in FIG. 5(a), irrespective of the distance x from the center pixel (center of the light axis) of the image data. When histogram aggregation is performed for the color component Ave (R/G), the resulting histogram will include only a single class (bin), as shown in FIG. 5(b). To the contrary, when color shading takes place, the color component Ave (R/G) is not constant as shown in FIG. 5 (c). In short, the color is not even. When histogram-aggregation is performed for the color component Ave (R/G), the resulting histogram will include a plurality of classes (bins), as shown in FIG. 5(d). The same is applied to the color component Ave (B/G).

Thus, color shading correction, if performed based on the suitable correction information to image data in which color shading takes place, corrects the color shading and the value of the color component will be ideally constant, i.e., the color will be even, irrespective of the distance x from the center pixel (center of the light axis) from the image data, as shown in FIG. 5(a). In the present embodiment, the correction-information selection unit 316 sorts blocks of image data, which is subjected to color shading correction by the trial shading-correction unit 315, into a plurality of classes (bins) based on the values of a color component (e.g., a class of values 0.0 to 0.2, a class of values 0.2 to 0.4, . . . ), and totalizes the number of blocks in each class (bin), i.e., performs histogram aggregation. Then, the correction-information selection unit 316 selects a set of correction information associated with a light-source, which results in a histogram with the highest maximum frequency (the largest number of substantially evenly-colored blocks) as the correction information that leads to a suitable shading-correction result.

FIG. 6 shows an example case where color shading correction is performed to image data of a subject presenting a single color, with sets of correction information associated with three light-sources that are: a light-source A, a light-source B, and a light-source C, respectively. FIG. 6(a) and FIG. 6(b) show a case where color shading is performed with correction information associated with the light-source A. This is an excessive correction and the color component tends to increase with an increase in the distance x, as shown in FIG. 6(a). In the resulting histogram, the maximum frequency is 5, as shown in FIG. 6(b). FIG. 6(c) and FIG. 6(d) show a case where color shading is performed with correction information associated with the light-source B. In this case, the color shading is suitably corrected, and therefore the value of the color component is constant, irrespective of the distance x, as shown in FIG. 6(c). In the resulting histogram, the maximum frequency is 10, as shown in FIG. 6(d). FIG. 6(e) and FIG. 6(f) show a case where color shading is performed with correction information associated with the light-source C. This is an insufficient correction and the color component tends to decrease with an increase in the distance x, as shown in FIG. 6(e). In the resulting histogram, the maximum frequency is 6, as shown in FIG. 6(f). In this example, the correction-information selection unit 316 selects correction information associated with the light-source B resulting in a histogram with the highest maximum frequency of 10, as the correction information that leads to a suitable color shading-correction result.

(2) Second, it is assumed that the subject presents more than a single color, i.e., a general object. In this case, the subject image constitutes areas of various colors. Of these areas, an area suitable for estimation of color shading characteristic is an area of a certain size, in a single color. On the other hands, areas in colors different from that of the area concerned are not suitable for color shading characteristic and are therefore need to be counted out.

FIG. 7 shows an example case where color shading correction is performed to image data of a subject presenting more than a single color, with correction information associated with three light-sources that are: a light-source A, a light-source B, and a light-source C, respectively. However, it is assumed that the subject contains a certain amount of an area presenting a single color. FIG. 7(a) and FIG. 7(b) show a case where color shading is performed with correction information associated with the light-source A. This is an excessive correction, and with a partial exception, the color component tends to increase with an increase in the distance x, as shown in FIG. 7(a). In the resulting histogram, the maximum frequency is 4, as shown in FIG. 7(b). FIG. 7(c) and FIG. 7(d) show a case where color shading is performed with correction information associated with the light-source B. In this case, the color shading is suitably corrected, and therefore the value of the color component is constant with a partial exception, irrespective of the distance x, as shown in FIG. 7(c). In the resulting histogram, the maximum frequency is 6, as shown in FIG. 7(d). FIG. 7(e) and FIG. 7(f) show a case where color shading is performed with correction information associated with the light-source C. This is an insufficient correction and with a partial exception, the color component tends to decrease with an increase in the distance x, as shown in FIG. 7(e). In the resulting histogram, the maximum frequency is 4, as shown in FIG. 7(f). In this example, the correction-information selection unit 316 selects correction information associated with the light-source B resulting in the histogram with the highest maximum frequency of 6 as the correction information that leads to a suitable color shading-correction result.

In the above method, selection of suitable correction information is relatively correct, in relation to a subject with a relatively large area presenting a single color. It is known that a person would more easily perceive color shading taking place in a relatively large area presenting a single color, than that taking place in a relatively small area presenting a single color. Therefore, a subject for which suitable correction information is easily selectable according to the method of the present embodiment matches with a subject a person would easily perceive color shading taking place therein. Therefore, the above method of the present embodiment enables effective color shading correction.

The shading correction unit 317 evaluates the reliability of the correction information selected by the correction-information selection unit 316 as follows. This evaluation of the reliability involves the maximum frequency of histogram calculated by the correction-information selection unit 316 in relation to the correction information selected by the correction-information selection unit 316. The reliability is evaluated as to be high if the maximum frequency/the parameter is large, and is evaluated as low if the maximum frequency/the parameter is small. For example, the reliability may be evaluated by comparing, with a threshold, the maximum frequency/the parameter. This value indicates the reliability, because the maximum frequency/the parameter corresponds to the size of a single color area of the subject. The parameter corresponds to the number of blocks each indicated by bold lines in FIG. 2, and the maximum frequency is equivalent to the number of blocks corresponding to a maximum evenly-colored area. Therefore, the maximum frequency/the parameter corresponds to the broadness of the maximum evenly-colored area of the entire subject. In the method of the present embodiment, the larger the evenly-colored area, the more likely the suitable correction information be selected. In other words, the value of the maximum frequency/the parameter suitably indicates the reliability, as hereinabove mentioned.

When the reliability of the correction information selected by the correction-information selection unit 316 is high to some extent, the shading correction unit 317 performs color shading correction on image data, based on that correction information. While the trial shading-correction unit 315 performs trial color shading correction to a plurality of blocks, the shading correction unit 317 performs color shading correction to each pixel of image data. Color shading correction is performed by calculation involving the following Expression (5) and Expression (6). The coefficients jr1, jb3, and the like in the expressions are coefficients corresponding to the correction information selected by the correction-information selection unit 316. It should be noted that color shading correction is performed with a G component as the reference. Therefore, the G component is not corrected.

$$R'=R/(1+jr1*x^2+jr2*x^4+jr3*x^4+jr4*x^8) \quad \text{Expression (5)}$$

$$B'=B/(1+jb1*x^2+jb2*x^4+jb3*x^4+jb4*x^8) \quad \text{Expression (6)}$$

$$G'=G \quad \text{Expression(7)}$$

When the reliability of the correction information selected by the correction-information selection unit 316 is low to some extent, the shading correction unit 317 performs color shading correction on image data, based on adjusted correction information which the correction information selected by the correction-information selection unit 316, having been adjusted. In the present embodiment, the shading correction unit 317 performs color shading correction on image data, using adjusted correction information which is a set of information different from the correction information selected by the correction-information selection unit 316, stored in the correction-information storage unit 311. For example, a light-source of 5500K in color temperature on a daylight curve is set as a default light-source, and shading coefficients related to this light-source are stored in the correction-information storage unit 311. Then, correction information related to this light-source may be used as adjusted correction information when the reliability is low. Alternatively, instead of such a simple substitution, correction information related to the default light-source and the correction information selected by the correction-information selection unit 316 may be weighted and used according to the reliability. Further, correction information selected by the correction-information selection unit 316 in the past and the correction information selected by the correction-information selection unit 316 this time may be weighted and used according to the reliability.

Figure 8:
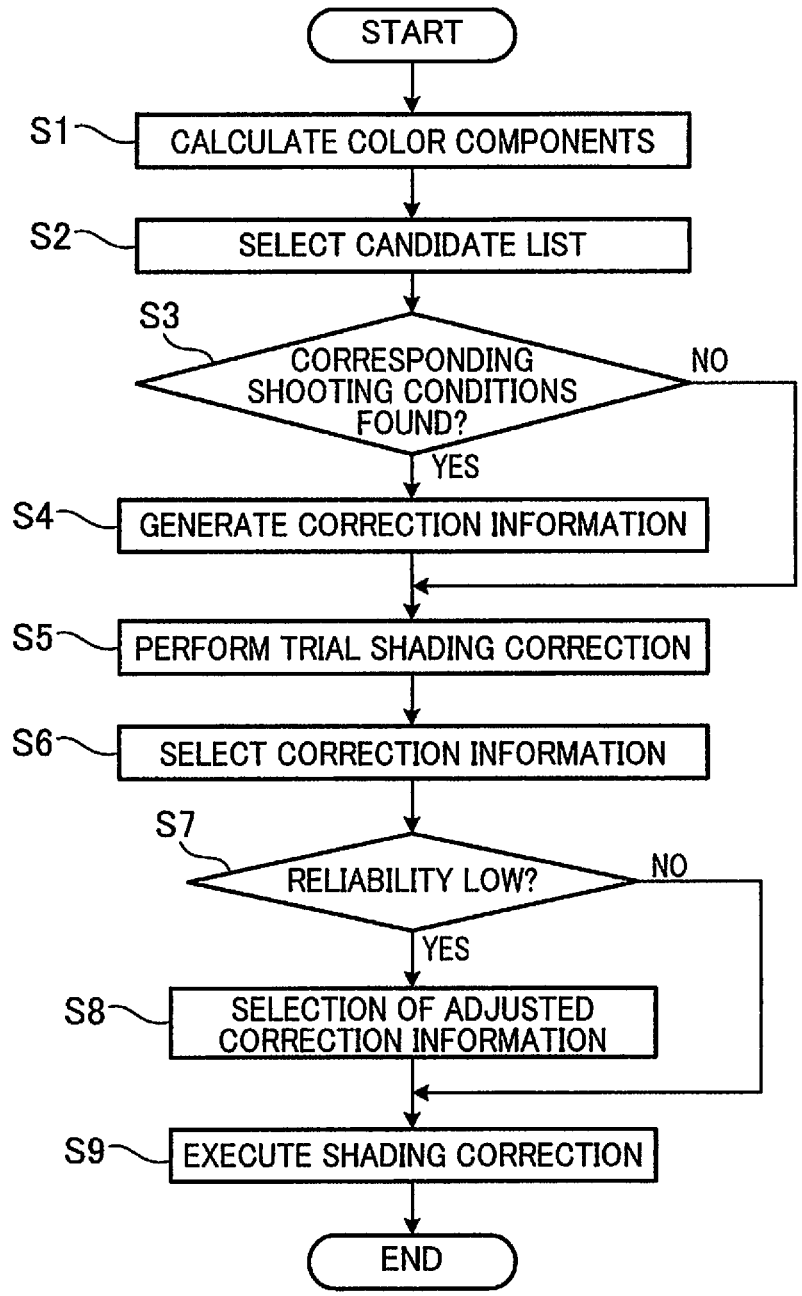
FIG. 8 is a flowchart showing steps of a shading correction unit executing color shading correction on image data.

The following describes a process of color shading correction on image data executed by the shading correction unit 310, with reference to the flowchart shown in FIG. 8. For example, this process is executed after capturing of an image is done by the imaging device 1.

The color component calculation unit 312 calculates color components Ave (R/G) and Ave (B/G) for each block of image data output from the imaging element 200 (S1). Next, the candidate list selection unit 313 selects a candidate list from a plurality of sets of correction information stored in the correction-information storage unit 311 (S2). Next, the correction information generator 314 determines whether the shooting conditions by the image capture optical system 100 and the imaging element 200 correspond to those stored in the correction-information storage unit 311 (S3). When the correction information generator 314 determines the shooting conditions do not correspond (S3: No), the correction information generator 314 newly generates correction information corresponding to the shooting conditions by the image capture optical system 100 and the imaging element 200, based on the correction information stored in the correction-information storage unit 311, and adds the information to the candidate list (S4). When the correction information generator 313 determines that the shooting conditions do correspond (S3: Yes), or after S4, the trial shading-correction unit 315 performs trial color shading correction on image data for each light-source based on the correction information in the candidate list (S5).

Next, the correction-information selection unit 316 compares results of the trial color shading correction performed by the trial shading-correction unit 315 with one another, and selects a set of correction information that leads to a suitable shading-correction result out of a plurality of sets of correction information stored in the correction-information storage unit 311, in relation to a plurality of light-source types (S6). Next, the shading correction unit 317 determines whether the reliability of the correction information selected by the correction-information selection unit 316 is low (S7). When the shading correction unit 317 determines that the reliability of the correction information selected by the correction-information selection unit 316 is low (S7: Yes), the shading correction unit 317 selects adjusted correction information from the correction-information storage unit 311 (S8). When the shading correction unit 317 determines that the reliability of the correction information selected by the correction-information selection unit 316 is not low (S7: No), or after S8, color shading correction on image data is performed based on the correction information selected by the correction-information selection unit 316 or the adjusted correction information (S9).

As described hereinabove, in the present embodiment, the shading correction unit 310 compares, with one another, results of trial color shading corrections performed in relation to a plurality of light-source types, and uses correction information yielding the suitable color shading-correction result. Therefore, unlike the traditional art, color shading correction on image data is possible by estimating a color shading characteristic from image data, without a need for information such as color temperature or chromaticity. In other words, color shading correction is performed while accurately distinguishing the light-source from the image data.

Further, in the present embodiment, the correction-information selection unit 316 compares with one another results of color shading correction performed in relation to a plurality of light-source types, to select correction information that yields a result with the largest evenly-colored area as the correction information that leads to a suitable color shading-correction result. Therefore, correction information that leads to a suitable color shading-correction result is accurately selectable from pieces of correction information stored in the correction-information storage unit 311 in relation to a plurality of light-source types.

Further, in the present embodiment, the correction-information selection unit 316 sorts blocks each including a plurality of pixels into a plurality of classes (bins) related to values of a color component based on the results of color shading correction performed for a plurality of light-source types. Then, for each light-source, the correction-information selection unit 316 totalizes the number of blocks in each of the classes, and selects correction information corresponding to a light-source which resulting in aggregated values of the plurality of classes including the highest maximum value, as the correction information that leads to a suitable shading-correction result. Therefore, correction information that leads to a suitable color shading-correction result is more accurately selectable from pieces of correction information stored in the correction-information storage unit 311 in relation to a plurality of light-source types.

Further, in the present embodiment, the candidate list selection unit 313 selects candidates of correction information (candidate list) from sets of correction information, in relation to a plurality of light-source types, based on the shooting condition when taking an image with an image capture optical system 100 and the imaging element 200. The candidate list is for selecting correction information that leads to a suitable color shading-correction result. Then, the correction-information selection unit 316 selects correction information that leads to a suitable color shading-correction result, from sets of correction information selected as candidate by the candidate list selection unit 313. As such, the trial shading-correction unit 315 performs trial color shading correction on image data for each light-source, based on narrowed down sets of correction information which are candidates out of all the sets of correction information related to a plurality of light-source types. The correction-information selection unit 316 then selects correction information that leads to a suitable color shading-correction result. Therefore, the amount of calculation is reduced. This also reduces time needed for selecting the correction information that leads to a suitable color shading-correction result.

Further, in the present embodiment, the candidate list selection unit 313 estimates the illuminance based on the shooting conditions, and determines whether the correction information is one for cases where the light-source is sunlight or for cases where the light-source is an artificial light-source.

Further, in the present embodiment, when the shooting conditions by the image capture optical system 100 and the imaging element 200 do not correspond to those stored in the correction-information storage unit 311, the correction information generator 314 newly generates correction information corresponding to shooting conditions involving the image capture optical system 100 and the imaging element 200, based on the correction information stored in the correction-information storage unit 311. Therefore, there is no need for storing correction information according to shooting conditions. This allows reduction of the capacity of the correction-information storage unit 311.

Further, in the present embodiment, the correction information is a function according to a distance from a center pixel constituting image data. That is, unlike the traditional art, the correction information is not 2-dimensional data corresponding to positions of pixels in image data. Therefore, it is possible to reduce the capacity of the correction-information storage unit 311. Further, the amount of calculation in color shading correction is reduced. This reduces the time needed for color shading correction.

Further, in the present embodiment, when the maximum value related to a light-source resulting in the greatest maximum value among the aggregated values of the plurality of classes, the shading correction unit 317 performs color shading correction on image data based on adjusted correction information which is the selected correction information having been adjusted. Therefore, the accuracy of the shading correction is improved.

Further, in the present embodiment, the adjusted correction information is a set of information stored in the correction-information storage unit 311 but is separate from the correction information selected by the correction-information selection unit 316. In other words, color shading correction is performed to image data by the shading correction unit 317, based on substituted correction information different from the correction information selected by the correction-information selection unit 316. Therefore, the adjusted correction information is obtainable without a need of performing calculation processes and the like based on the selected correction information.

Next, the following describes a second embodiment of the present invention. The second embodiment has the same structure as that of the first embodiment except in that a correction-information selection unit different from the correction-information selection unit 316 is adopted. The correction-information selection unit related to the second embodiment is different from the correction-information selection unit 316 in the method of selecting the correction information that leads to the suitable color shading-correction result. The method is described hereinbelow.

Figure 9:
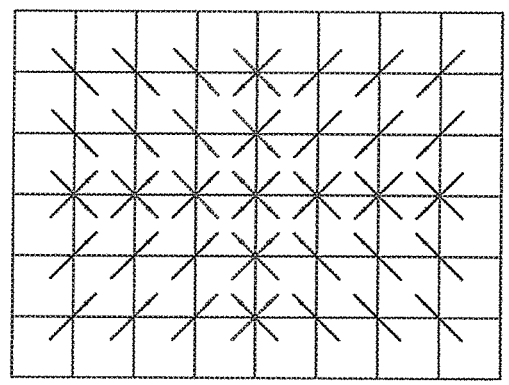
FIG. 9 is an example image data parted into 8×6 blocks.

The correction-information selection unit related to the second Embodiment is the same as that of the first Embodiment in that color shading correction is performed in relation to a plurality of light-source types, and that histogram aggregation is carried out to blocks of pixels based on the results. However, while the first Embodiment deals with a case where the aggregation is carried out based on the color components Ave (R/G) and Ave (B/G) of the blocks, the aggregation is carried out based on color gradation in the second Embodiment. The color gradation is retrieved by calculating the differences in Ave (R/G) and AVE (B/G) of blocks adjacent in a tangential direction. Arrows in FIG. 9 show example tangential directions of the blocks. The difference is calculated for blocks corresponding to both ends of each arrow.

Then, the correction-information selection unit carries out histogram aggregation with respect to the blocks based on the gradation calculated. For example, when the aggregation is carried out in relation to the blocks shown in FIG. 9, a pixel at the start end of an arrow is associated with a color gradation (difference) between blocks at both ends of that arrow, and the blocks are sorted into a plurality of classes (bins) related to gradations. Then, for each class, the number of blocks is aggregated. The correction-information selection unit performs the above described histogram aggregation for each light-source, and derives the class (bins) with the maximum frequency as a characteristic value. Then, the correction-information selection unit selects correction information associated with the light-source resulting in a characteristic value, i.e., a bin of a gradation value, closest to zero as correction information that leads to a suitable color shading-correction result. As the result of performing trial corrections, the correction information resulting in blocks concentrated on a gradation value closest to zero is selected as the suitable correction information. As should be understood from the above, it is the aggregation result of the gradation values nearby zero which is important in the present embodiment. Therefore, the aggregation may be carried out only for ranges of gradation values nearby zero.

FIG. 10 shows an example case where color shading correction is performed to image data of a subject presenting a single color, with correction information associated with three light-sources that are: a light-source A, a light-source B, and a light-source C. FIG. 10(a) and FIG. 10(b) show a case where color shading is performed with correction information associated with the light-source A. This is an excessive correction and the Ave (R/G) tends to increase with an increase in the distance x, as shown in FIG. 10(a). The traversal axis of the graph in FIG. 10(a) indicates the distance from the center of the light axis, and therefore corresponds to the axis along a tangential direction. Therefore, the difference in Ave (R/G) of adjacent plots in the graph corresponds to the gradation value. The arrows in FIG. 10(a) each indicate the magnitude and the direction of the gradation. FIG. 10(b) is a histogram aggregation related to correction result of FIG. 10 (a), in which blocks are aggregated to classes (bins) related to color gradation. As shown in FIG. 10(b), in the second Embodiment, the aggregation is carried out for a certain range of gradation values nearby zero (−0.05≤gradation≤0.05 in this example). This is because the aggregation result of the gradation values nearby zero is important in the present embodiment as hereinabove mentioned.

Figure 10A:
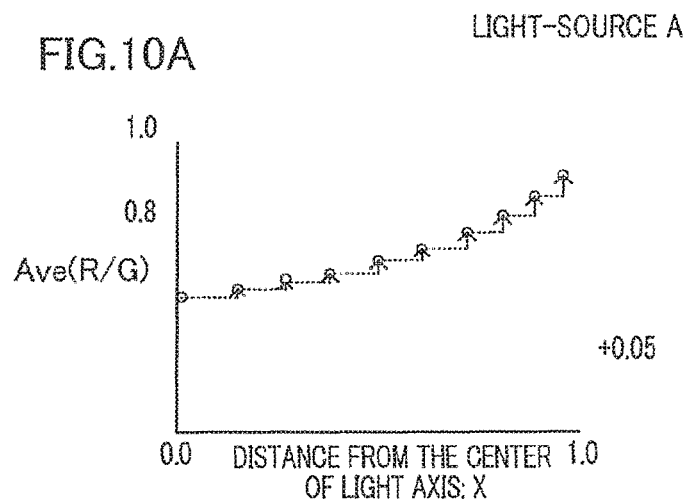
FIGs. 10(a)-10(f) show example cases where color shading correction is performed to image data of a subject presenting a single color.
Figure 10B:
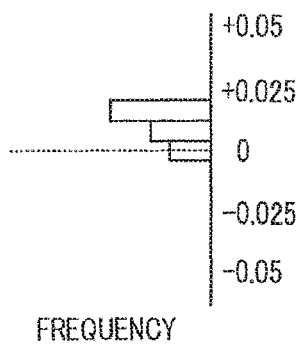
Figure 10C:
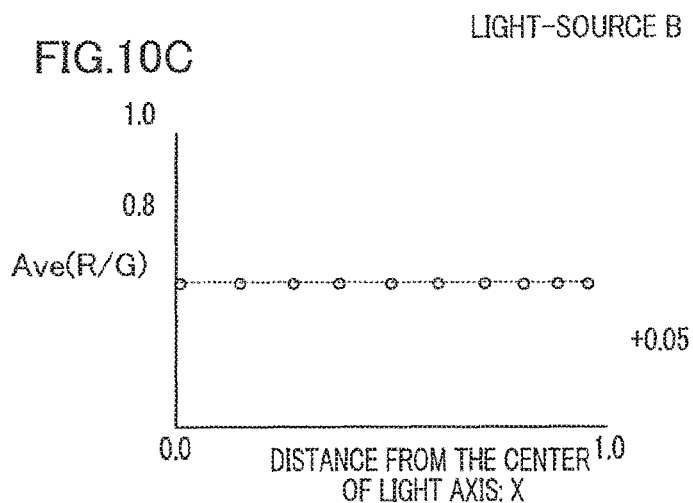
Figure 10D:
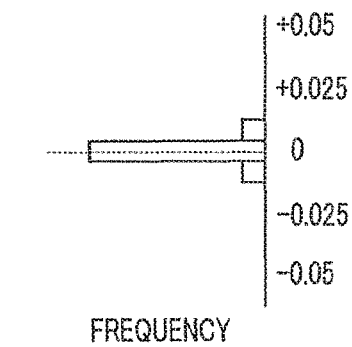

FIG. 10(c) and FIG. 10(d) show a case where color shading is performed with correction information associated with the light-source B. In this case, the color shading is suitably corrected, and therefore the Ave (R/G) is substantially constant, irrespective of the distance x, as shown in FIG. 10(c). FIG. 10(d) is a histogram aggregation related to correction result of FIG. 10 (c), in which blocks are aggregated to classes related to color gradation. As in FIG. 10(b), the aggregation is carried out for a certain range of gradation values nearby zero.

Figure 10E:
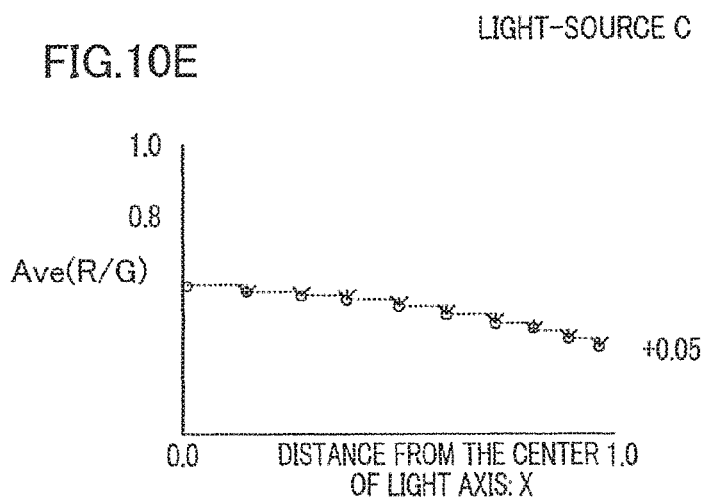
Figure 10F:
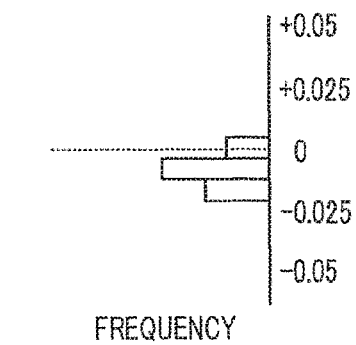

FIG. 10(e) and FIG. 10(f) show a case where color shading is performed with correction information associated with the light-source C. This is an insufficient correction and the Ave (R/G) tends to decrease with an increase in the distance x, as shown in FIG. 10(e). As in FIG. 10(a), the arrows in FIG. 10(e) each indicate the magnitude and the direction of the gradation. FIG. 10(f) is a histogram aggregation related to correction result of FIG. 10 (e), in which blocks are aggregated to classes related to color gradation. As in FIG. 10(b), the aggregation is carried out for a certain range of gradation values nearby zero.

Here, the correction-information selection unit extracts, as a characteristic value, the bin (class) within the above aggregation range, with the maximum frequency, and then selects correction information associated with a light-source with which the maximum frequency occurs to a bin closest to the gradation value of zero. In case of FIG. 10, it is the light-source B with which the maximum frequency occurs in the bin closest to zero, and therefore the correction information associated with the light-source B is selected.

It should be noted that, as to the method of deriving the characteristic value, other various methods are adoptable in addition to the above method. For example, the characteristic value may be the median of a distribution range of a histogram within a certain range closest to the gradation value of zero. For example, where the values are distributed within a range of −0.05 to 0.025, the characteristic value is the median value=(−0.05+0.025)/2=−0.0125. Then, correction information associated with a light-source with which this characteristic value is the smallest (closest to zero) may be selected. Since the characteristic value is the median value of the distribution range of the histogram, the characteristic value indicates blocks are concentrated roughly at what gradation value.

Alternatively, it is possible to calculate an average value within a half-value range of the maximum frequency, and this average value may be used as the characteristic value. By half-value range of the maximum frequency, it means a range covering: the bin where the maximum frequency occurs; and bins of values not less than the half value of the maximum frequency, which bins are continuous to the bin of the maximum frequency. In the histogram of FIG. 10(f) for example, the range corresponds to the bin of the maximum frequency and the adjacent bin on the negative side of the bin of the maximum frequency. If there is another peak nearby the peak including the bin of the maximum frequency, that other peak is kept from influencing selection of the correction information by limiting the range on which the average value is based as described above. The average value is calculated as follows. In the following expression, Σf is the total of all the f values of bins within the half value range of the maximum frequency.

Average value=Σ{(frequency of each bin)*(gradation value of the bin)}/{Σ(frequency of each bin)}

Then, correction information associated with a light-source with which this average value as the characteristic value is the smallest (closest to zero) may be selected. Since the characteristic value is the average value of the peak including the maximum frequency, the characteristic value indicates the blocks are concentrated roughly at what position of the peak.

As should be understood, the correction-information selection unit of the present embodiment selects correction information that leads to a suitable shading-correction result by performing shading correction to a plurality of light-source types, and comparing the resulting distributions of pixels with one another, in relation to color gradation in a tangential direction, within a range of bins of gradation values at and/or nearby zero. Therefore, correction information that leads to a suitable shading-correction result is accurately selectable from sets of correction information stored in the correction-information storage unit 311 in relation to a plurality of light-source types.

Further, the present embodiment deals with a case where, based on the results of shading correction performed in relation to a plurality of light-source types, the correction-information selection unit: (a) sorts pixel blocks each including one or more pixels into a plurality of classes (bins) related to color gradation; (b) aggregates the number of blocks in each of the classes; and (c) obtains characteristic values each indicating, at what gradation value, the blocks are concentrated as the result of aggregation; and then selects, as the correction information that leads to a suitable shading-correction result, a set of correction information associated with a light-source resulting in a characteristic value indicating a gradation value closest to zero. Therefore, correction information that leads to a suitable shading-correction result is more accurately selectable from pieces of correction information stored in the correction-information storage unit 311 in relation to a plurality of light-source types.

Embodiments of the present invention are thus described hereinabove. It should be however noted that application of the present invention is not limited to the embodiments described above, and various modifications are possible as exemplified below, provided that such modifications do not depart the scope of the present invention.

The above embodiments each deal with a case where color shading characteristic is stored in the correction-information storage unit 311 as the correction information. Instead of this, a color shading correction characteristic for color shading correction may be stored as the correction information. The color shading correction characteristic is an inverse function of the color shading characteristic, and are expressed in the following Expression (8) and Expression (9).

$$(1+ir1*x^2+ir2*x^4+ir3*x^6+ir4*x^8)=1/(1+jr1*x^2+jr2*x^4+jr3*x^4+jr4*x^8) \quad \text{Expression (8)}$$

$$(1+ib1*x^2+ib2*x^4+ib3*x^4+ib4*x^8)=1/(1+jb1*x^2+jb2*x^4+jb3*x^4+jb4*x^8) \quad \text{Expression (9)}$$

In the present modification, the trial shading-correction unit 315 uses the following Expression (10) and Expression (11), in place of Expression (3) and Expression (4), for trial color shading correction on image data.

$$\text{Ave}(R/G)'=\text{Ave}(R/G)*(1+ir1*x^2+ir2*x^4+ir3*x^6+ir4*x^8) \quad \text{Expression (10)}$$

$$\text{Ave}(B/G)'=\text{Ave}(B/G)*(1+ib1*x^2+ib2*x^4+ib3*x^4+ib4*x^8) \quad \text{Expression (11)}$$

Further, in the present modification, the shading correction unit 317 uses the following Expression (12) to Expression (14), in place of Expression (5) to Expression (7), for color shading correction on image data.

$$R'=R*(1+ir1*x^2+ir2*x^4+ir3*x^6+ir4*x^8) \quad \text{Expression (12)}$$

$$B'=B*(1+ib1*x^2+ib2*x^4+ib3*x^4+ib4*x^8) \quad \text{Expression (13)}$$

$$G'=G \quad \text{Expression (14)}$$

When the present modification is compared with the above embodiments, the divisions are replaced with multiplications. Therefore, the amount of calculation is reduced, and the time needed for color shading correction is also reduced.

In the above embodiments, shading coefficients related to characteristic function are stored in the correction-information storage unit 311 as the correction information corresponding to a color shading characteristic. The correction-information storage unit 311 may also store correction information corresponding to color shading characteristic in the form other than functions. For example, the correction-information storage unit 311 may store in the form of table color shading characteristic or correction values for correcting color shading, in various positions of an image.

Further, in the above embodiments, the shading correction unit 310 is configured to perform only color shading correction on image data. However, the shading correction unit 310 may perform brightness shading correction on image data, in addition to color shading correction. To this end, the correction-information storage unit 311 stores, as correction information, brightness shading characteristic indicative of how the brightness shading is distributed in relation to positions of a captured image. As in the color shading characteristic, the brightness shading characteristic is expressed in the following Expression (15), as a function of distance x from the center pixel of image data.

$$fg(x)=jg0/(1+jg1*x^2+jg2*x^4+jg3*x^6+jg4*x^8) \quad \text{Expression (15)}$$

The coefficients jg1 to jg4 corresponding to a light-source are selectable as in the cases of color shading. For example, as in the above embodiments, trial shading correction may be performed for each of R, G, and B, extract brightness component from the results and perform histogram aggregation, and select correction information associated with a light-source that results in the highest maximum frequency as the correction information that leads to a suitable light-source. Then, based on the correction information selected, brightness shading correction may be performed in combination with color shading correction, through the following calculations of Expression (16) to Expression (18), in place of Expression (5) to Expression (7) for color shading correction only.

$$R'=R/(1+jr1*x^2+jr2*x^4+jr3*x^4+jr4*x^8)/(1+jg1*x^2+jg2*x^4+jg3*x^6+jg4*x^8) \quad \text{Expression (16)}$$

$$B'=B/(1+jb1*x^2+jb2*x^4+jb3*x^4+jb4*x^8)/(1+jg1*x^2+jg2*x^4+jg3*x^6+jg4*x^8) \quad \text{Expression (17)}$$

$$G'=G/(1+jg1*x^2+jg2*x^4+jg3*x^6+jg4*x^8) \quad \text{Expression (18)}$$

In the above embodiments, the candidate list selection unit 313 is configured to select correction information for a case where the light-source is sunlight or correction information for a case where the light-source is an artificial light-source. In addition to this, if color temperature and chromaticity coordinates of a light-source under a shooting environment are available, it is possible to further narrow down the correction information from the correction information for a case where the light-source is sunlight or the correction information for a case where the light-source is an artificial light-source, by the candidate list selection unit 313. For example, if the color temperature is high, the light-source of low color temperatures such as "sunset" can be excluded from the correction information for a case where the light-source is sunlight. This reduces the number of times the trial shading correction is performed to image data by the trial shading correction unit 315, consequently reducing the amount of calculation involved.

Further, in the above embodiments, when the shooting conditions by the image capture optical system 100 and the imaging element 200 do not correspond to those stored in the correction-information storage unit 311, the correction information generator 314 newly generates correction information corresponding to shooting conditions by the image capture optical system 100 and the imaging element 200, based on the correction information stored in the correction-information storage unit 311. In addition to this, if color temperature of a light-source under a shooting environment is available, it is possible to generate correction information for color temperatures not stored in the correction-information storage unit 311. For example, suppose that the correction-information storage unit 311 stores correction information for a case where the color temperature of the light-source is 6500K and correction information for a case where the color temperature of the light-source is 5500K, and that the color temperature under a shooting environment is 6000K. In this case, the correction information generator 314 newly generates (synthesizes) correction information for 6000K based on the correction information for 6500K and correction information for 5500K, by means of linear interpolation.

In the above embodiments, image data is divided into blocks, and the average value of color components in each of the blocks is divided by a brightness component to derive color components Ave (R/G) and Ave (B/G). Then, using these color components, trial color shading correction and selection of correction information are performed. In the above embodiments, image data is divided into blocks, and the average value of in each of the blocks is divided by a brightness component to obtain color components Ave (R/G) and Ave (B/G). Then, using these color components, trial color shading correction and selection of correction information are performed. That is, the first Embodiment may be adapted so that, for each light-source, the correction-information selection unit 316 sorts pixels into a plurality of classes related to values of color components based on the results of color shading correction performed to all the pixels of image data and aggregate the number of pixels in each class, and then selects correction information that leads to a suitable color shading-correction result. Further, the second Embodiment may be adapted so that, pixels are sorted into a plurality of classes related to color gradation based on the results of color shading correction performed to all the pixels of image data; the number of pixels in each of the classes are aggregated and the characteristic values each indicating, at what gradation value, the pixels are concentrated as the result of aggregation is derived for each light-source; and then correction information associated with a light-source with which the gradation value indicated by the characteristic value is closest to zero is selected as the correction information that leads to a suitable shading-correction result.

In the above first Embodiment, when the maximum frequency among the plurality of classes related to a light-source with which the maximum frequency is the highest is not more than a predetermined value, the shading correction unit 317 determines that the reliability of the correction information selected by the correction-information selection unit 316 is low, and performs color shading correction on image data, based on adjusted correction information which is the correction information selected by the correction-information selection unit 316, having been adjusted. In addition to the above, when the ratio of the maximum value among the aggregated values of the plurality of classes to the aggregation parameter is not more than a predetermined magnitude, the shading correction unit 317 determines that the reliability of the correction information selected by the correction-information selection unit 316 is low, and performs color shading correction on image data, based on adjusted correction information which the correction information selected by the correction-information selection unit 316, having been adjusted. For example, in the histogram of FIG. 6(*b*) where 10 blocks are aggregated for each of the classes, the resulting maximum frequency (the maximum value of the aggregated value) is 5, and the ratio of the maximum frequency to the aggregation parameter 10 is ½. In such a case, the shading correction unit 317 may determine that the reliability of the correction information selected by the correction-information selection unit 316 is low.

In the above first Embodiment, when the color shading correction 317 determines that the reliability of the correction information selected by the correction-information selection unit 316 is low, the shading correction unit 317 may perform color shading correction on image data by using, as adjusted correction information, a set of correction information different from the correction information which is selected by the correction-information selection unit 316 and stored in the correction-information storage unit 311. In addition to the above, the shading correction unit 317 may calculate out adjusted correction information by performing a calculation process and the like to correction information selected by the correction-information selection unit 316.

The above embodiments each deal with a case where the correction-information storage unit 311 stores a plurality of sets of correction information associated with a single light-source. Alternatively, the correction-information storage unit may store correction information associated with a combination of a plurality of light-sources.

INDUSTRIAL APPLICABILITY

The present invention is applicable to image correction corresponding to a plurality of light-sources with different spectral characteristics.

REFERENCE SIGN LIST

1. Imaging Device
100. Image Capture Optical System
200. Imaging Element
300. Image Processor
310. Shading Correction Unit
311. Correction-Information Storage Unit
312. Color component Calculation Unit
313. Candidate List Selection Unit
314. Correction Information Generator
315. Trial Shading-Correction Unit
316. Correction-Information Selection Unit
317. Shading Correction Unit

The invention claimed is:
1. An image processing device, comprising:
a storage means for storing sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein the sets of the correction information are stored in association with a plurality of light-source types as shooting conditions, respectively;
a trial correction means for performing trial shading correction on image data based on the sets of correction information stored in the storage means, the trial shading correction performed in relation to at least two light-source types out of the plurality of light-source types;
a first selection means for comparing results of the shading correction with one another, the shading correction being performed by the trial correction means in relation to said at least two light-source types, and selecting a set of correction information that leads to a suitable shading-correction result, out of the sets of correction information stored in the storage means in association with the plurality of light-source types; and
a correction means for performing shading correction on the image data based on the set of correction information selected by the first selection means,
wherein the first selection means, in relation to each of the at least two light-source types, sorts pixels or pixel blocks each including a plurality of pixels into a plurality of classes related to values of a color component, based on the results of the shading correction performed in relation to the at least two light-source types; aggregates the number of the pixels or the pixel blocks of each of the classes and selects a set of correction information corresponding to a light-source type that results in a highest maximum value among aggregated values of the classes, as the set of correction information that leads to a suitable shading-correction result.

2. An image processing device, comprising:

a storage means for storing sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein the sets of the correction information are stored in association with a plurality of light-source types as shooting conditions, respectively;

a trial correction means for performing trial shading correction on image data based on the sets of correction information stored in the storage means, the trial shading correction performed in relation to at least two light-source types out of the plurality of light-source types; a first selection means for comparing results of the shading correction with one another, the shading correction being performed by the trial correction means in relation to said at least two light-source types, and selecting a set of correction information that leads to a suitable shading-correction result, out of the sets of correction information stored in the storage means in association with the plurality of light-source types; and a correction means for performing shading correction on the image data based on the set of correction information selected by the first selection means, wherein the first selection means selects correction information that leads to a suitable shading-correction result, by performing shading correction for the at least two light-source types, and comparing the resulting distributions of pixels with one another, in relation to color gradation in a tangential direction, within a range of a gradation values including zero and values approximating thereto.

3. The image processing device, according to claim 2, wherein based on the results of the shading correction performed in relation to the at least two light-source types, the first selection means: (a) sorts pixels or pixel blocks each including a plurality of pixels into a plurality of classes related to color gradation; (b) aggregates the number of the pixels or the pixel block in each of the classes; and (c) obtains characteristic values each indicating, at what gradation value, the pixel blocks are concentrated as the result of aggregation; and then selects, as the set of correction information that leads to a suitable shading-correction result, a set of correction information corresponding to a light-source type resulting in a characteristic value indicating a gradation value closest to zero.

4. An image processing device, comprising:

a storage means for storing sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein the sets of the correction information are stored in association with a plurality of light-source types as shooting conditions, respectively;

a trial correction means for performing trial shading correction on image data based on the sets of correction information stored in the storage means, the trial shading correction performed in relation to at least two light-source types out of the plurality of light-source types; a first selection means for comparing results of the shading correction with one another, the shading correction being performed by the trial correction means in relation to said at least two light-source types, and selecting a set of correction information that leads to a suitable shading-correction result, out of the sets of correction information stored in the storage means in association with the plurality of light-source types; and a correction means for performing shading correction on the image data based on the set of correction information selected by the first selection means, said device further comprising a second selection means for selecting sets of correction information to be candidates for the first selection means to select the set of correction information that leads to a suitable shading-correction result, from the sets of correction information stored in the storage means in association with the plurality of light-source types based on the shooting conditions involving an imaging device configured to output image data, wherein the first selection means selects the set of correction information that leads to a suitable shading-correction result from the sets of correction information selected by the second selection means as the candidates.

5. The image processing device according to claim 4, wherein the storage means stores first correction information which is a set of correction information associated with sunlight as the light-source type, and second correction information which is a set of correction information associated with an artificial light-source as the light-source type, the second selection means estimates illuminance at a time of shooting based on the shooting conditions, selects the first correction information when the estimated illuminance is a predetermined value or higher, and selects the second correction information when the estimated illuminance is lower than the predetermined value.

6. An image processing device, comprising:

a storage means for storing sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein the sets of the correction information are stored in association with a plurality of light-source types as shooting conditions, respectively;

a trial correction means for performing trial shading correction on image data based on the sets of correction information stored in the storage means, the trial shading correction performed in relation to at least two light-source types out of the plurality of light-source types; a first selection means for comparing results of the shading correction with one another, the shading correction being performed by the trial correction means in relation to said at least two light-source types, and selecting a set of correction information that leads to a suitable shading-correction result, out of the sets of correction information stored in the storage means in association with the plurality of light-source types; and a correction means for performing shading correction on the image data based on the set of correction information selected by the first selection means, said device further comprising a correction-information generating means for newly generating a set of correction information in association with a shooting condition involving the imaging device configured to output image data, based on the sets of correction information stored in the storage means, when no corresponding shooting condition is found in the storage means.

7. The image processing device according to claim 1, wherein
the set of correction information
are each a function involving a distance from a center pixel constituting the image data.

8. The image processing device according to claim 1, wherein the storage means,
when the storage means, stores the shading characteristic, stores information indicating a function which indicates a color intensity represented by a pixel value of the captured image of the subject presenting the single color, relative to the single color; and
when the storage device stores correction characteristic, the storage means stores information indicative of an inverse function of the function.

9. The image processing device according to claim 1, wherein
the correction means performs shading correction on the image data based on adjusted correction information which is an adjusted set of correction information selected by the first selection means, when the highest maximum value among the aggregated values of the plurality of classes or a ratio of the highest maximum value to an aggregation parameter is not more than a predetermined value.

10. The image processing device according to claim 9, wherein the adjusted correction information is a set of correction information stored in the storage means and separate from the set of correction information selected by the first selection means.

11. An image processing method, comprising:
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading beinq a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types, a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step, wherein, in relation to each of the at least two light-source types, pixels or pixel blocks each including a plurality of pixels are sorted into a plurality of classes related to values of a color component, in the selection step, based on the results of the shading correction performed in relation to the at least two light-source types; aggregates the number of the pixels or the pixel blocks of each of the classes and selects a set of correction information corresponding to a light-source type that results in a highest maximum value among aggregated values of the classes, as the set of correction information that leads to a suitable shading-correction result.

12. An image processing method, comprising:
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types, a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step, wherein in the selection step, correction information that leads to a suitable shading-correction result is selected, by performing shading correction for the at least two light-source types, and comparing the resulting distributions of pixels with one another, in relation to color gradation in a tangential direction, within a range of a gradation values including zero and values approximating thereto.

13. An image processing method, comprising:
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types,
a first selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and
a correction step of performing shading correction on the image data based on the set of correction information selected in the first selection step,
said method further comprising
a second selection step of selecting sets of correction information to be candidates of the set of correction information that leads to a suitable shading-correction result in the first selection step, from the sets of correction information stored in the storage means in association with the plurality of light-source types based on the shooting conditions involving an imaging device configured to output image data, and
wherein, in the first selection step, the set of correction information that leads to a suitable shading-correction result is selected from the sets of correction information selected in the second selection step as the candidates.

14. An image processing method, comprising
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types,
a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and
a correction step of performing shading correction on the image data based on the set of correction information selected in the selection step,
said method further comprising
a correction-information generating step of newly generating a set of correction information in association with a shooting condition involving the imaging device configured to output image data, based on the sets of correction information stored in the storage means, when no corresponding shooting condition is found in the storage means.

15. A non-transitory computer-readable recording medium recording thereon an image processing program which causes a computer to function so as to perform shading correction on image data, configured to execute:
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types;
a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and
a correction step of performing shading correction on the image data based on the set of correction information selected in the selection step,
wherein in relation to each of the at least two light-source types, pixels or pixel blocks each including a plurality of pixels are sorted into a plurality of classes related to values of a color component, in the selection step, based on the results of the shading correction performed in relation to the at least two light-source types; aggregates the number of the pixels or the pixel blocks of each of the classes and selects a set of correction information corresponding to a light-source type that results in a highest maximum value among aggregated values of the classes, as the set of correction information that leads to a suitable shading-correction result.

16. A non-transitory computer-readable recording medium recording thereon an image processing program which causes a computer to function so as to perform shading correction on image data, configured to execute:
a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types;

a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step, wherein in the first selection step, correction information that leads to a suitable shading-correction result is selected, by performing shading correction to the at least two types of light-sources, and comparing the resulting distributions of pixels with one another, in relation to color gradation in a tangential direction, within a range of a gradation values including zero and values approximating thereto.

17. A non-transitory computer-readable recording medium recording thereon an image processing program which causes a computer to function so as to perform shading correction on image data, configured to execute:

a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types;

a first selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the first selection step, said program configured to further execute a second selection step of selecting sets of correction information to be candidates of the set of correction information that leads to a suitable shading-correction result in the first selection step, from the sets of correction information stored in the storage means in association with the plurality of light-source types based on the shooting conditions involving an imaging device configured to output image data, wherein in the first selection step, the set of correction information that leads to a suitable shading-correction result is selected from the sets of correction information selected in the second selection step as the candidates.

18. A non-transitory computer-readable recording medium recording thereon an image processing program which causes a computer to function so as to perform shading correction on image data, configured to execute:

a trial correction step of performing trial shading correction on image data based on a set of correction information stored in a storage means which stores sets of correction information indicative of shading characteristics or correction characteristics for shading correction, wherein said shading characteristics each indicates distribution of shading relative to positions of an image captured, the shading being a phenomena in which, when the image captured is an image of a subject presenting a single color, pixel values of the image captured deviate from that resulting in the single color, and wherein said sets of correction information are stored in association with a plurality of light-source types as shooting conditions, respectively, the trial shading correction performed in relation to at least each of two light-source types, out of the plurality of light-source types;

a selection step of comparing results of the shading correction with one another, the shading correction being performed in the trial correction step for each of said at least two light-source types, and selecting a set of correction information that leads to a suitable shading-correction result, out of the sets of correction information stored in the storage means in relation to the plurality of light-source types; and a correction step of performing shading correction on the image data based on the set of correction information selected in the selection step, said program configured to further execute a correction-information generating step of newly generating a set of correction information in association with a shooting condition involving the imaging device configured to output image data, based on the sets of correction information stored in the storage means, when no corresponding shooting condition is found in the storage means.

* * * * *